Jan. 27, 1970  R. D. NOUROT ET AL  3,492,393

POLYURETHANE CONTAINER

Original Filed Oct. 16, 1961

*INVENTOR.*
RICHARD D. NOUROT
PAUL R. MATVEY
KEITH D. ROBINSON

J. B. Holden
ATTORNEY

United States Patent Office 3,492,393
Patented Jan. 27, 1970

3,492,393
POLYURETHANE CONTAINER
Richard D. Nourot, Monroe Falls, Paul R. Matvey, Akron, and Keith D. Robinson, Mogadore, Ohio, assignors to The Goodyear Tire & Rubber Company, Akron, Ohio, a corporation of Ohio
Continuation of application Ser. No. 145,089, Oct. 16, 1961. This application Nov. 2, 1966, Ser. No. 591,647
Int. Cl. B29f 1/10; B28b 1/54, 3/10
U.S. Cl. 264—279
9 Claims

ABSTRACT OF THE DISCLOSURE

This invention relates to a method of making containers by spraying liquid polyurethane reaction mixtures in successive coats on a mold, curing, and removing the finished container from the mold.

Figure 1:
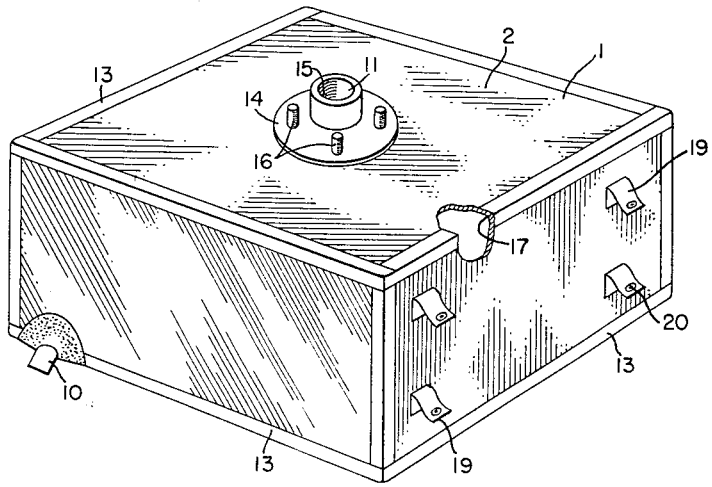

This application is a continuation of application Ser. No. 145,089, filed Oct. 16, 1961, now abandoned.

This invention is concerned with material containers and is more specifically concerned with light weight liquid containers which are particularly useful in aircraft and to the method of making said containers.

Hitherto, ultra light-weight fuel containers have generally been composed of layers of textile fabric and of fuel impervious polymeric elastomeric substances, these layers being firmly bonded together to produce a finished construction having the desired degree of flexibility, chemical strength and permanence when in contact with the liquid to be contained, for instance, a fuel. A cross section of these liquid containers presents the picture of alternate layers of textile fabric bonded together with a rubberlike composition. In addition, when the fuel container is to be used in an aircraft, the materials employed in the construction thereof are required to maintain their properties over the range of temperature and other conditions to which the aircraft will be subjected.

In commercial practice these ultra-light fuel containers are shaped on heavy forms, which are coated with glue as a releasing agent, by applying multiple layers of impregnated textile fabric over the surface of the form and cementing the layers together to obtain a container. Then the form is destroyed and removed through an opening in the container. This method of construction requires the use of relatively expensive frames and large amounts of hand labor; hence, fuel containers made by this method are relatively expensive and require special curing ovens and other apparatus which may not be readily available.

The present invention is addressed in one of its aspects to the problem of producing a light-weight fuel tank which will exhibit the above-mentioned and other desirable properties to a high degree.

According to the present invention a container is made which does not have the usual alternating layers of textile fabric cemented together with a rubberlike composition. In this invention the liquid container is made by spraying a liquid polyurethane reaction mixture onto a form containing a releasing agent and allowing the first spray coat to dry, preferably in air, until at least a major portion of the solvent has evaporated. Then additional coats of polyurethane may be applied by spraying and allowing the solvent to evaporate before the next coat is applied. This procedure is repeated until the desired thickness of the container is obtained, usually about 15 to 65 mils depending on size, shape and nature of the container. When the desired thickness is obtained by the application of sufficient spray coats, the built-up composition is cured at elevated temperature to completely cross-link the polyurethane composition. Then the building form is removed from the container to obtain a container having minimum amounts of textile fabric, if any.

If the container is to be used to hold a liquid fuel, it is desirable that the container have applied to it a fuel vapor barrier during the course of the application of the various polyurethane spray coats. The fuel vapor barrier may be applied directly to the form containing the releasing agent or alternatively it may be applied after the first, second or some other coating of polyurethane. Preferably the barrier coat is followed by additional polyurethane spray coats. Where the fuel cell or container is to be subjected to very severe conditions, it is desirable to apply a fabric coating on the outside of the container and then apply to the fabric coating at least 1 and preferably 2 or more coats of polyurethane. The use of a textile fabric in this manner effects a high degree of dimensional stability for the container and also permits brackets and other attaching means to be more readily cemented or fastened to the fuel tank to thereby allow the fuel tank to be more readily secured to the aircraft.

Figure 2:
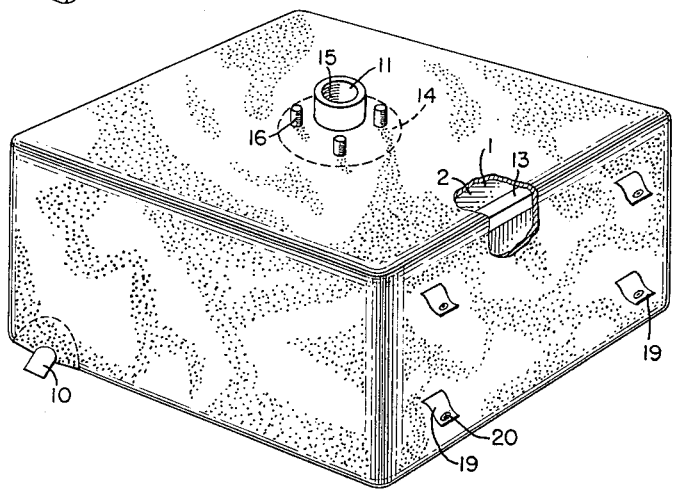
Figure 3:
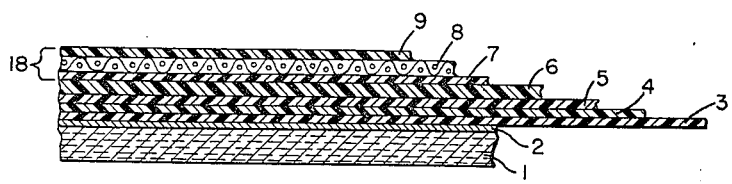
Figure 4:
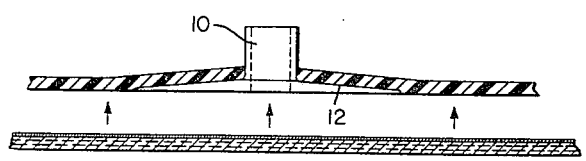

The essence of the invention may be understood from a consideration of the accompanying drawings in which FIG. 1 is a perspective view of a form for building a fuel cell or other liquid container with said form containing the fittings for forming openings in the fuel cell already in place. FIG. 2 is a perspective view of the finished fuel cell and FIG. 3 is an enlarged cross section through the fuel cell of FIG. 2 prior to the time the form is removed. FIG. 4 is an expanded partial view showing the fittings in the finished container and the building form.

Referring specifically to FIG. 3, numeral 1 denotes the building form which preferably is made of lightweight paper or cardboard having the desired size and shape. In building a container in accordance with this invention a first spray coat 3 of a polyurethane composition is applied over the building form 1 in contact with the releasing agent 2. The releasing agent can be applied to the form prior to spray coating or the form material may have the releasing agent applied during its manufacture. The first spray coat of polyurethane composition should be allowed to dry preferably in the open air until the coating is essentially free of solvent, then a second spray coat 4 of the polyurethane composition is applied over the first spray coat. Additional spray coats 5 of the polyurethane composition may be applied to each spray coat to yield a built-up composition of the desired thickness. Thus, in essence the built-up compositions comprise successive coats of sprayed polyurethane. Preferably each spray coat is dried until the surface is essentially free of solvent. Then if it is desired to produce a fuel cell, it is preferred that a fuel vapor barrier layer 6 be applied over the polyurethane coatings forming the inner liner.

The barrier layer 6 may be applied by spraying or brushing a solution selected from any of the vapor barrier materials well known to the art. This barrier layer is allowed to air dry until essentially tack free, then another spray coat 7 of a polyurethane composition is applied over the barrier layer. Additional spray coats of the polyurethane composition may be applied, if desired, or needed, to obtain the desired thickness of the fuel container. Usually each spray coat of the polyurethane composition is allowed to air dry until most of the solvent has evaporated before the next spray coat is applied. If it is so desired, a textile fabric 8 may be applied to the polyurethane coating while it is still tacky. The textile fabric 8 of FIG. 3 is smoothed into place over the form, care being taken to be sure all air bubbles trapped underneath the textile fabric is removed. Then a polyurethane spray coat 9 is applied over the textile fabric. Additional spray coats may be applied, if so desired, but in general practice it has been found that one to two spray coats on the outside of the textile fabric is sufficient. After the addition of the last spray coat of polyurethane to form outer lining 18, the liquid container, while still on the building form, is air cured in a curing chamber by contact with warm air for about 1 to 2 hours at 150–220° F.

The cured fuel container is removed from the form by any of the methods known to the art. Where the form is of the type that disintegrates in the presence of water, the form can be removed by filling the fuel container with water and allowing the water to stand in contact with the form for sufficient time to soften and decompose or disintegrate the form. Then the fuel container is tilted at the proper angle to pour out all the water along with the material of the building form.

It should be obvious to those familiar with the art of building fuel cells that fittings for forming openings in a liquid container are necessary and one of the advantages of this invention is that it permits these fittings to be attached to the form prior to the building of the fuel container, whereby these fittings 10 and 11 are built into the fuel container as an integral part thereof rather than being attached after the fuel cell has been built. Of course, it is possible to build a fuel tank in accordance with the teaching of this invention and add the fittings after the tank is built, but it has been found to be advantageous to have the fittings built into the tank as an integral part thereof. Reference to FIG. 4 shows fitting 10 built into the tank with the polyurethane adhered to the shoulders 12 of the fitting.

These fittings may be of the usual metallic type but the use of cast polyurethane fittings offer certain advantages from a weight standpoint and also obviates the need to dope the fittings to get adequate adhesion of the polyurethane coatings.

Where metallic fittings are used, it is preferred to coat the fitting with an adhesive to insure satisfactory adhesion of the polyurethane coating to the metal fitting. Any of the adhesives known to the art of adhering polyurethanes to metal may be used but a preferred one comprises 20 parts of a 70/30 copolymer of styrene/acrylonitrile dissolved in 80 parts ethylene dichloride and 20 parts of a commercial epoxy resin, such as Epon 828 from Shell Chemical Company, dissolved in 80 parts of ethylene dichloride. This adhesive is mixed and applied to the fitting a few minutes prior to application of the polyurethan coatings.

The building form for use in this invention is preferably made of thin cardboard having sufficient strength to be dimensionally stable for the size and shape of the liquid container desired, which may vary in size from a few to several hundred gallons. This cardboard is scored to facilitate shaping then bent together to form a building form for a container of the desired size and shape and then the bent sections are fastened together in the lap areas, as by cementing or with masking tape. Normally in the areas where the cardboard is folded and in the lap areas there are slight irregularities along the surface of the form. It has been found advantageous to place a masking tape 13 or a filling material along the seams and cracks to smooth out the irregularities and to promote bridging during the application of the various spray coats. Also it is desirable to provide openings for filling and emptying the tanks and any other openings that are desired. The fittings desired are preferably attached to the form with a release agent and prior to the time the first spray coat is applied to the form. Generally the fitting 11 for the filling opening consists of a flange 14 with an internal threaded opening 15 and bolts 16 for attaching an exterior flange (not shown) after the fuel tank has been formed. It is desirable to cover the openings and the threads of bolts projecting outward from the flange to thereby prevent fouling the threads and blocking of these openings.

Where many units of the same size and shape are to be built as in an assembly line operation, a permanent form of the pneumatic type would be preferred to the cardboard form which is destroyed after each liquid container has been made. An elastomeric pneumatic type form could be inflated and fitted with the proper fittings and covered with a releasing agent, then the liquid coating composition can be applied in the manner described where the cardboard box is used except the elastomeric form would be deflated and pulled from the cured liquid container. Hence by using an inflatable and deflatable elastomeric pneumatic building form the need for large amounts of water to destroy the cellulose form and for a means for disposing of the cellulose slurry from the form is eliminated. A principal advantage of the use of elastomeric penumatic form would be the fact the form could be used repeatedly without the need to form a new one for each liquid container.

The releasing agents useful in this invention are those that do not react with the polyurethane reactants to reduce the flexibility, tear, tensile strength and cold temperature properties of the cured polyurethane composition. Any of the many releasing agents or parting agents useful in preparing polyurethane castings may be used in this invention provided they meet the above requirements. The preferred parting agent for use with the paper forms are the polyvinylalcohols such as the ones available under the trade name Gelvatol–40–10 and Gelvatol–40–20. These polyvinylalcohols are water soluble and do not detrimentally affect the interfacial properties of the cured polyurethane composition. In use the polyvinylalcohols are normally made up as a solution or dispersion in water. Usually about 20 to 35% polyvinylalcohol dissolved in water containing a small amount, usually about one-fourth of a percent, of a wetting agent such as the alkyl aryl ethers have viscosities which are suitable for either spray coating or brush coating onto the form. Normally it is preferred that the polyvinyl alcohols have a viscosity at 20°C. of about 1.3 to 3 centipoises in a 25–35% water solution. Alternately, the cardboard or paper of the form can be coated during manufacture of the paper with a polyethylene or polypropylene waxy coating and this coating can serve as the release agent. In fact, the use of cardboard having this waxy finish applied during manufacture of the cardboard eliminates the operation of applying the release coat to the shaped building form.

The spray coating polyurethane composition of this invention comprises a liquid reaction mixture of (1) a prepolymer of an organic polyisocyanate and a reactive hydrogen containing polymeric material such as the polyesters, polyesteramides and polyethers dissolved in sufficient solvent to yield a sprayable mixture and (2) sufficient crosslinking agent to react with the free polyisocyanate. Normally, this spray coating polyurethane composition should contain from about 40 to 65% solids or even more. Spray compositions containing less than 40% solids can be used. However, where the solid content of the spray composition is very low the individual spray coats will be thinner and the amount of solvent to be disposed of or recovered will be larger than with a higher solid content spray composition. About 55% and even higher solid content spray compositions are desired so long as the solid content is not too high to prevent uniform coating of the form or a tendency to flow. Preferably the solid content should be 60 to 85% if the mixture is still sprayable at this solid content. As indicated above the thickness of each spray coat is to a certain extent determined by the solid content of the spray. Also the solid content of the spray affects the solvent pollution problem in the spraying area, therefore it is desirable that the solid content of the spray composition be adjusted to give a spray coat of about 1.5 to about 4 mils in thickness. Where the coating thickness per spray pass exceeds about 5 mils the coating frequently exhibits a tendency to sag or flow instead of going on as a satin smooth film that is customarily obtained and desired.

Any of the polyesters, polyesteramides and polyethers suitable for making polyurethane castings may be used either as is or by suitable modifications to prepare the spray coating polyurethane composition of this invention. In general the polyesters are preferred over the polyethers for the preparation of these spray coating polyurethane compositions. This preference is based primarily upon the fact the polyesters produce coatings of greater strength and solvent resistance than the polyethers.

Representative examples of the polyesters useful in this invention are the condensation products of a glycol with an organic dicarboxylic acid or anhydride having a molecular weight of about 700 to 5000 and preferably from 1000 to 3000. Representative glycols are ethylene, propylene, butylene, pentylene, decamethylene, etc. Representative examples of the organic dicarboxylic acids or anhydrides are succinic, glutaric, adipic, phthalic, terephthalic, isophthalic, suberic, sebacic, pimelic, and azelaic. Also, small amounts, i.e., 1 to 20% or more, of certain tri- or higher functional polyols and acids can be used to produce a small amount of branching in the polymeric material. Castor oil may be used in small amounts, too.

The prepolymers of this invention may be prepared from reactive hydrogen containing polymeric materials (hereinafter sometimes referred to in a more restricted sense as polymeric glycols or polyols) and an organic polyisocyanate by the procedures well known to the art. Any of a wide variety of polymeric glycols having a molecular weight of from 750 to 10,000 may be used. Of the polymers prepared from polyalkylene ether glycols, the polytetramethylene ether glycols are preferred. It is to be understood that other polyols such as polyalkylenearylene ether glycols or triols, polyalkylene etherthioether glycols or triols and polyester glycols, including alkyd resins, may be used.

In the preparation of the isocyanate-terminated polymers, a molar excess of a polymeric polyol such as a polyalkylene ether glycol or polyester glycol are first reacted with an organic diisocyanate to prepare a polyurethane glycol which may subsequently be reacted with a molar excess of an organic diisocyanate so as to prepare an isocyanate-terminated polymer. Alternatively, the polymeric glycol may be reacted directly with a molar excess of an organic diisocyanate. In the preparation of these polymers, overall molar ratios of organic diisocyanate to polymeric polyol of between 1.1:1 and 12:1 should be used at temperatures ranging from about 20 to about 150° C. The preferred ratios are about 1.2:1 to 2:1.

Any of a wide variety of organic diisocyanates may be employed for the preparation of the isocyanate-terminated polymer, including aromatic, aliphatic and cycloaliphatic diisocyanates and combinations of these types. Representative compounds include toluene-2,4-diisocyanate; mixtures of toluene-2,4- and -2,6-di-isocyanates; m-phenylene diisocyanate; 4-chloro-1,3-phenylene diisocyanate; 4,4'-biphenylene diisocyanate; 1,5-naphthylene diisocyanate; 1,4-tetramethylene diisocyanate; 1,6-hexamethylene diisocyanate; 1,10-decamethylene diisocyanate; 1,4-cyclohexylene diisocyanate; 4,4'-methylene-bis(cyclohexyl isocyanate) and 1,5-tetrahydronaphthylene diisocyanate. For purposes of the present invention, the toluene-diisocyanates; diphenylmethane-4,4'-diisocyanate and 3, 3'-dimethyl-4,4'-bisphenylene diisocyanate are preferred and these respective diisocyanates are sometimes hereinafter referred for convenience as TDI, MDI and TDOI.

These prepolymers are dissolved or dispersed in suitable solvents hereinafter described and then are mixed with a crosslinking agent which preferably is dissolved or dispersed in a suitable solvent. The amount of solvent used for preparing the dispersion of the prepolymer or mixtures of polymeric polyols and polyisocyanates and the crosslinking agent are determined primarily by the viscosity desired in the mixture and the nature of the spraying equipment in which the mixture is to be used. If high pressure spray equipment is used, the amount of solvent required may be less as higher viscosities can be tolerated. Hence, the solid content of the reaction mixture may be very high and contain only a few percent solvent. The crosslinking agent may be a material containing three or more reactive groups, e.g. glycerol or triethanolamine, but bifunctional materials are preferred. In general, the bifunctional materials yield products having superior spraying properties. Representative classes of compounds suitable for use as crosslinking agents are the glycols, the diamines having primary or secondary amino groups, the dicarboxylic acids, the hydroxy amines, the hydroxycarboxylic-acids and the amino-carboxylic acids. Representative examples of suitable compounds belonging to these classes are ethylene glycol; 1, 3-propane-diol; 1,4-butane-diol; ethylene diamine; trimethylene diamine; tetramethylene diamine; m-phenylene diamine; o- and m-dichlorobenzidine; 2,5-dichloro-phenylene diamine; 3,3'-dichloro-4,4'-diamine-diphenyl methane; dianisidine; 4,4'-diamino-diphenyl-methane; naphthylene diamines; tolylene-2,4-diamine; p-aminobenzyl aniline; o- or p-amino-diphenyl-amine; 2-aminoethyl alcohol; 2-amino-1-naphthol; m-aminophenol; glycollic acid; alpha-hydroxy propionic acid; amino acetic acid and amino benzoic acid. The preferred glycol crosslinker is butane diol and the chloroamines such as ortho dichlorobenzidine and methylene bis orthochloroaniline are the preferred amine crosslinkers. The respective chloroamines above are sometimes referred to herein for convenience as ODCB and MOCA.

A method for selecting the diisocyanates and diamines which form sprayable liquid reaction mixtures that can be mixed and used with a single container-type spray gun is the boiling methylene chloride turbidity test. By this method semimolar solutions of the diisocyanate and diamine are made with methylene chloride. The respective methylene chloride solutions of diisocyanate and diamine are raised to the boiling temperature and mixed. If a turbidity develops inside of 25 to 30 seconds, this combination of diisocyanate and diamine will not yield a reaction mixture which can be sprayed under normal conditions. Thus, special spray conditions are required, for instance, very low temperature or a spray gun containing a mixing head must be used. On the other hand, those mixtures of diisocyanate and diamine which do not produce a turbidity inside of about 25 to 50 seconds can be sprayed with normal spray conditions. Some combinations especially well suited for use in this invention are TDI–MOCA
TDI–ODCB
TDI–APS [1]
TODI–MOCA
TODI–ODCB
TDOI–APS
MDI–MOCA
MDI–ODCB
Naphthalene diisocyanate–MOCA
Naphthalene diisocyanate–ODCB
Naphthalene diisocyanate–APS
4,4′-diphenyl diisocyanate–MOCA
4,4′-diphenyl diisocyanate–ODCB
4,4′-diphenyl diisocyanate–APS

[1] APS is bis(3,3′-amino phenyl)sulfone.

Any of the non-reactive solvents normally used in making paints which are suitable for spraying may be used in this invention. Representative examples of these are benzene, toluene, the paraffinic napthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, cellosolve acetate, cellosolve propylate, cellosolve acetate butyrate, dioxane, etc. Mixtures of certain solvents in particular amounts may be desirable to obtain satisfactory spreading properties and evaporation rates when the polyurethane spray composition is applied to a surface. This is especially true where very volatile solvents such as benzene and acetone are used.

Also it is desirable to add to the spray composition certain pigments and other additives such as surface active agents, leveling agents, for instance, cellulose acetate butyrate, and other additives well known to the spray coating art. In particular, it is desirable to add about 0.5 to 5 parts and preferably about 1 to 2 parts of a pigment such as carbon black or other dark pigment on a hundred parts of prepolymer basis to increase the ultra-violet resistance and to comply with government regulations in regard to the coloring of liquid fuel cells for aircraft.

The addition of from 1 to about 30 parts of a leveling agent per hundred parts of prepolymer to the solvent or the solvent mixture of the prepolymer or the solvent mixture of the crosslinking agent results in the sprayed surface having a satin smooth finish. The addition of a leveling agent also results in the sprayed surface being free of peaks or projections that cause the finished article to contain pinholes. Where the sprayed coat is not satin smooth and contains peaks and projections, holes are frequently obtained in the first spray coat and even sometimes in the finished liquid container when it is stripped from the building form. These holes have to be patched and frequently result in the complete rejection of an otherwise satisfactory fuel cell.

Submicroscopic pyrogenic silica such as prepared in a hot gaseous environment by the vapor phase hydrolysis of silicon tetrachloride and available from Godfrey L. Cabot, Inc. under the trademark Cab–O–Sil is especially useful as a leveling agent in the sprayable polyurethane compositions when used in about 0.1 to 10 parts per 100 parts of solids in the solution. The preferred amount is about 0.5 to about 4 parts as the amount of solvent needed to give a sprayable viscosity is not materially changed. Also, this range of pyrogenic silica gives good thixotropic properties to the resulting sprayable composition.

Where the liquid container is to be used to hold liquids which are relatively good solvents for polyurethane materials or produce appreciable swelling thereof, it is desirable to add a barrier layer to the fuel cell either on the inner surface or in an intermediate part of the liquid container. Where the liquid to be held by the container is a fuel, the customary practice is to use as a barrier layer a coating consisting of either a polyvinyl alcohol or a polyamide such as nylon. The barrier coat is brushed on the surface until the desired thickness of the particular barrier material is obtained, usually about 1 to 10 mils. The barrier material, for example, polyvinyl alcohol or a polyamide before it is applied is dissolved in a solvent such as one of the lower alcohols, liquid hydrocarbons (either aromatic, naphthenic or paraffinic) acetone and methyl ethyl ketone. The amount of the barrier material used with the solvent is usually about 5 to 35% by weight. At any rate, the amount of solvent used should be sufficient to give a fluid mixture which can be readily applied to the surface of the polyurethane coating by methods such as brushing or dipping.

The use of textile fabric, including woven wire screens to cover the liquid container, is desirable to give added reinforcing to the liquid container and also to serve as a member to distribute the stress and strain away from the point where the fuel cell is attached to the airplane. Also the use of a textile fabric coating can be used to offer resistance to abrasion and wear at particular points along the liquid container surface. The preferred textile fabrics are normally of the square woven mesh type and the preferred fabrics are made from a textile grade of polyester or polyamide, although other fabrics can be used. Fabrics of this type are well known in the fuel cell art and are available under various names such as nylon, Dacron, Terylene, etc.

In order to further describe the invention, several embodiments thereof are set forth with respect thereto. However, it should be understood that such embodiments are set forth for illustrative and not limitative purposes. All parts are by weight unless otherwise designated.

Example I

A liquid container suitable for use as a fuel cell can be made with the technique and formulations of this example.

A form 1 for an airplane fuel cell was formed by bending and fastening together a piece of cardboard box, then the seams 17 of the form were taped together with a thin paper tape 13 containing a glue. A flange fitting 11 was placed at the point where the opening in the container was desired. A drainage fitting 10 of the cast polyurethane type was placed on the form at the point where the outlet opening was desired. These fittings were secured to the form with a suitable adhesive, for instance, the releasing agent. After the fittings were attached and secured to the form, a release coating 2 consisting of a 25% water solution of Gelvatol 40–10, a commercial polyvinyl alcohol was applied over the form and allowed to air dry. In some cases it was found to be beneficial to add from about .05 to .3% by weight of a nonionic wetting agent such as the alkyl aryl ethers, as the use of a wetting agent facilitated the wetting of the form by the releasing agent. It should be noted at this point that the use of too much wetting agent in the releasing agent may tend to cause pinholes in the first coat of the polyurethane.

Over the releasing agent the first coating 3 of the polyurethane liquid reaction mixture was sprayed. Any suitable spray gun such as the type used for ordinary spray painting may be used. With some polyurethane liquid reaction mixtures the use of a catalyst spray gun, wherein the components are mixed in the spray head, may be used to advantage but in general the use of ordinary spray equipment with a single pot wherein components 1 and 2 were mixed just prior to spraying has been found satisfactory. The thickness of each spray coat may depend upon a number of variables such as the spray operator and the nature of the spray mixture but normally the thickness of each spray coat will vary from about 1 mil up to 5 or more mils in thickness.

After the application of the first spray coat, it is allowed to dry at about 70–80° F. until the coat is essentially solvent-free. During this standing and drying the solvent evaporates and a certain amount of curing of the polyurethane coating occurs. When the first coat is essentially solvent free, additional spray coats 4 and 5 are applied and allowed to air dry between coats as indicated with the first spray coat. After the addition of the third spray coat of polyurethane, a polyamide solution was brushed on over the third spray coat to form a vapor barrier 6. This polyamide solution consisted of 85% by weight of ethyl alcohol and 15% by weight of a polyamide of the familiar nylon type. The first polyamide coating was allowed to dry, then a second polyamide coating was brushed on.

A first outer coating 7 of polyurethane was sprayed over the polyamide coatings without the use of a tie cement or gum. Then additional coats were applied if needed or desired. These coatings of polyurethane form the outer coat 18. Each coat was allowed to dry before the next coat was applied. After the addition of the second spray coat of polyurethane a suitable cut and shaped nylon web-woven fabric 8 was applied by hand over the last coating of polyurethane while this coating was still wet and tacky. It is desirable at this point to attach the usual straps 19 having the usual fastener grommets 20 to the fabric web in order that the finished fuel cell may be fastened more readily within the airplane fuel compartment. After the straps and fasteners have been secured to the fabric, a final spray coating 9 of polyurethane was applied over the nylon fabric and allowed to air dry for a few minutes. Then the built-up fuel cell, while still on the form, was placed in an air oven. The fuel cell was allowed to cure at about 220° F. for 2 hours in this oven before being removed. When the cell had cooled, sufficient water was added to the fuel cell to cause disintegration of the cardboard box. After several hours the cardboard box had disintegrated and was poured out of the fuel cell. This fuel cell was submitted to the various tests required by U.S. Government specifications for fuel cells. This cell passed these tests and was approved for use on light airplanes.

The polyurethane liquid reaction mixture used in this example was prepared from a prepolymer. This prepolymer was prepared by reacting 2 mols of toluene diisocyanate with 1 mol of a polyester prepared by the condensation of adipic acid with an excess of a mixture consisting of 80% by weight ethylene glycol and 20% by weight propylene glycol. This prepolymer was used to prepare a black masterbatch by ball milling 1250 parts of this prepolymer with 375 parts cellosolve acetate, 125 parts carbon black and 375 parts of methyl ethyl ketone. The ball milling was continued until a uniform suspension was obtained.

Component 1 of the spray mixture was formed by mixing 165 parts of this black masterbatch with a mixture consisting of 1500 parts of the prepolymer, 450 parts cellosolve acetate, 450 parts methyl ethyl ketone and 72 parts of a solution of cellulose acetate butyrate containing 10% by weight of a mixture containing 50% xylene and 50% methyl cellosolve acetate. Component 2 of this sprayable mixture comprises 153 parts of methylene-bis-orthochloroaniline and 153 parts of methyl ethyl ketone. Components 1 and 2 were mixed just prior to the time the spray coats were to be applied to form the sprayable polyurethane liquid reaction mixture. Normally the mixture of Components 1 and 2 remained sprayable in excess of one hour.

Example II

Another two-component spray recipe satisfactory for making liquid containers in accordance with the procedure of Example I is given below:

COMPONENT 1

| Ingredient: | Parts |
|---|---|
| Prepolymer | 63 |
| Cellosolve acetate | 18.5 |
| Methyl ethyl ketone | 18.5 |
| Cellulose acetate butyrate | 0.4 |
| Lampblack | 1.0 |

COMPONENT 2

| | |
|---|---|
| Diamine | 1 |
| Methyl ethyl ketone | 1 |

The following prepolymers were used in the formulation of Component 1 of this example:

Prepolymer A

A reaction product of 2 mols of tolylene diisocyanate with about 1 mol of a polyester formed by condensing an excess of ethylene glycol with adipic acid.

Prepolymer B

Same as Prepolymer A except the mol ratio used was 1.1 to 1.

Prepolymer C

Same as Prepolymer A except propylene glycol was used to produce the polyester.

Prepolymer D

Same as Prepolymer A except methylene diphenylene diphenylene diisocyanate was used instead of toluene diisocyanate.

Prepolymer E

The same as Prepolymer C except methylene diphenylene diisocyanate was used instead of toluene diisocyanate.

Prepolymer F

The reaction product of 2 mols of toluene diisocyanate with 1 mol of a polytetramethylene ether glycol having a molecular weight of about 3000.

Each of the Prepolymers A through F were used to make Component 1. Then each of these Component 1 mixes were combined with a Component 2 mix where methylene-bis-orthochloroaniline and orthodichlorobenzidine was the diamine used to make Component 2. Each of these resulting mixes of Components 1 and 2 were then used to make a fuel cell according to the procedure of Example I.

A preferred method of making a fuel cell for a small airplane is illustrated in the following example as this sprayable polyurethane composition offers the advantage of reducing the number of spray coats of polyurethane and also yields a fuel cell having improved structural properties.

Example III

A masterbatch was prepared by ball milling the following ingredients:

| | Parts |
|---|---|
| Prepolymer [1] | 2000 |
| Cellosolve acetate | 600 |
| Methyl ethyl ketone | 600 |
| Cellulose acetate butyrate | 80 |
| Cab-O-sil | 50 |
| High abrasion furnace black | 20 |

[1] This prepolymer can be any of those from Example 2 bearing letters A through F.

This masterbatch was used as Component 1 of the liquid reaction mixture. Component 2 of this liquid reaction mixture, which consisted of 192 parts of methylene bis orthochloroaniline dissolved in 192 parts of methyl ethyl ketone, was mixed with Component 1 and used to spray fuel cell forms in accordance with the technique of Example I.

Since the Cab-O-Sil permitted thicker spray coats to be built up without flow or sag occurring, the number of spray coats required was reduced. When using this formulation an interlayer thickness of 10 to 25 mils was easily laid down in two spray coats. The barrier layer of nylon was brushed on over the inner layer and then a single spray coat of polyurethane of about 5 to 10 mils in thickness was applied over the nylon barrier layer. This outer layer of polyurethane was then followed with a woven fabric. In the construction of one fuel cell a woven polyamide fiber was used and a woven polyester fabric was used in the construction of a second fuel cell. A single spray coat of polyurethane was then applied over the fabric to complete the building of the respective fuel cells. These two fuel cells, i.e., the one containing the polyamide fabric and the one containing the polyester were placed in an air oven and cured at about 200° F. for two hours. After the cured cells were removed from the oven, the cardboard building frame was distintegrated by soaking in water and then the water and cardboard were poured from the cells. These two cells pass the qualifying tests required to meet Government specifications on approved airplane fuel cells.

From the above example, it should be evident that the use of finely divided pulverulent silicon dioxide permits sprayed structures of 30 to 75 mils in thickness to be built up with a very few spray coats. In fact, structures up to 200 mils may be readily built up in this manner and offers certain advantages over pressure injection molded or cast structures. This advantage is thought to be due to the oriented layers of urea groups at the coating interfaces which are believed to offer certain strength advantages. Also the spray built-up structures appear to be free of stresses found in injection molded objects as well as being free of sprue marks and weak spots associated with sprue and mold seams.

The sprayable polyurethane compositions of this invention have thus far been described as comprising a prepolymer, a solvent, a cross-linking agent and certain other additive agents. Although the embodiments described previously herein illustrate the best method of accomplishing this invention, those skilled in the art would realize that a sprayable reaction mixture comprising a reactive hydrogen containing polymeric material and an organic diisocyanate in sufficient solvent can be mixed and then sprayed even immediately, if desired, upon the container form. Then in a very short time the spray coat will react to form the prepolymer in situ on the building form. Hence, the prepolymer which now forms the coating can be crosslinked by exposure to an atmosphere which contains vapors such as those of water, diamine or glycol to produce a polyurethane composition of a nature simulating that obtained by the previously described embodiments. Also, it should be appreciated that the nature of this spray coat can be varied by prolonging the time between spray coats and the nature of the vapor content of the atmosphere to which the building form containing the spray coat is exposed prior to final cure. It should be further appreciated that the tensile strength of containers made in this manner may be as much as a thousand pounds per square inch, less than the ones obtained by the procedure of Example I.

While certain representative embodiments and details have been shown for the purpose of illustrating the invention, it will be apparent to those skilled in this art that various changes and modifications may be made therein without departing from the spirit or scope of the invention.

What is claimed is:
1. A method of forming a liquid container comprising the successive steps of:
   (1) spray coating a suitable form with a sprayable polyurethane liquid reaction mixture comprising
      (a) a prepolymer formed by reacting a reactive hydrogen containing polymeric material with a molecular weight of at least 700 selected from the class of polymeric polyols consisting of polyesters and polyethers with at least 1 mol and no more than about 2 mols of polyisocyanate for each mol of polymeric polyol;
      (b) a sufficient amount of nonreactive solvent to give a sprayable mixture; and
      (c) a crosslinker selected from the polyfunctional monomeric reactants containing only the reactive groups of amino and hydroxyl, and then
   (2) drying each spray coat until it is essentially solvent-free before applying the next coat,
   (3) applying at least 1 and sufficient additional spray coats of said mixture to obtain a structure of the desired thickness,
   (4) curing the entire structure, and
   (5) removing the form from the liquid container.

2. The method of claim 1 wherein the polyisocyanate and the polyfunctional monomeric reactant containing reactive amino groups are selected from those that the reaction between the polyisocyanate and the polyfunctional monomeric reactant in boiling methylene chloride in semimolar concentration causes no turbidity inside of 25 seconds.

3. The method of claim 1 wherein the reaction mixture contains 1 to 30 parts of a leveling agent for each hundred parts of total reactive hydrogen containing polymeric material and organic polyisocyanate.

4. The method of claim 3 wherein the leveling agent is selected from those consisting of cellulose acetate butyrate and submicroscopic pyrogenic silica.

5. A method of forming a liquid container comprising the successive steps of
   (1) spray coating a suitable mold with a sprayable polyurethane liquid reaction mixture comprising
      (a) a prepolymer of a hydroxyl terminated polyester having a molecular weight of at least 700 resulting from the condensation of a monomeric polyol with an acidic material selected from the organic dicarboxylic acids and their anhydrides with at least 1 mol and not more than about 2 mols of a polyisocyanate for each mol of hydroxyl terminated polyester,
      (b) a sufficient amount of nonreactive solvent to give a sprayable mixture, and
      (c) an organic diamine;
   (2) drying each spray coat until it is essentially solvent-free before applying the next coat;
   (3) applying at least 1 and sufficient additional spray coats of said mixture to obtain a structure of the desired thickness;
   (4) curing the entire structure, and
   (5) removing the form from the liquid container.

6. The method of claim 5 wherein the sprayable polyurethane liquid reaction mixture contains from 1 to less than 30 parts of submicroscopic pyrogenic silica.

7. The method of claim 5 wherein the building form is constructed by cutting out a sheet of cardboard which has scored portions corresponding to the corners of the form, bending the cardboard sheet about the scored portions to build the closed form.

8. The method of claim 7 wherein the seams of the cardboard form are covered with a masking tape to facilitate obtaining a uniform thickness in the built-up container.

9. The method of claim 5 wherein prior to step (a) at least one polyurethane fitting is releasably secured in position on the mold, whereby the finished container will have the fittings built integrally within said container.

(References on following page)

References Cited

UNITED STATES PATENTS

| | | | |
|---|---|---|---|
| 2,165,099 | 7/1939 | Hansen | 18—58 |
| 2,355,084 | 8/1944 | Kurrle | 150—0.5 |
| 2,369,921 | 2/1945 | Shakesby | 150—0.5 |
| 2,381,739 | 8/1945 | Gray | 150—0.5 X |
| 2,439,562 | 4/1948 | Cunningham | 150—0.5 X |
| 2,453,604 | 11/1948 | Tenebaum et al. | 18—47.5 |
| 2,457,066 | 12/1948 | Pepersack | 150—0.5 X |
| 2,558,807 | 7/1951 | Bailey | 150—0.5 X |
| 2,594,235 | 4/1952 | Taylor | 150—0.5 |
| 2,844,178 | 7/1958 | Coleman | 150—0.5 X |
| 3,009,209 | 11/1961 | Weinbrenner et al. | 18—58 |
| 2,770,386 | 11/1956 | Mitchell et al. | 264—274 |
| 3,105,062 | 9/1963 | Graham et al. | 264—309 |
| 2,778,810 | 1/1957 | Muller et al. | 260—45.4 |
| 2,962,470 | 11/1960 | Jung | 260—45.4 |
| 3,129,014 | 4/1964 | Hutchison et al. | 264—255 X |
| 2,770,386 | 11/1956 | Mitchell et al. | |
| 3,129,014 | 4/1964 | Hutchinson et al. | |

OTHER REFERENCES

Von Fischer and Bobalek: Organic Protective Coatings, Reinhold Publishing Corp., 1953, pp. 58–59.

"Cab-O-Sil, General Properties, Functions, and Uses", Cabot Corp., Boston, Mass., C Gen–1, January 1955, revised May 1960.

Technical Information Bulletins, Nos. 3–C3 and 18–C7, dated Oct. 20, 1958 and Apr. 10, 1959, Mobay Chemical Company.

J. H. Saunders et al.: Polyurethanes Chemistry and Technology, 1964, pp. 533–535 and 604.

JULIUS FROME, Primary Examiner

T. MORRIS, Assistant Examiner

U.S. Cl. X.R.

150—5; 260—37; 264—255, 308

PO-1050
(5/69)

UNITED STATES PATENT OFFICE
CERTIFICATE OF CORRECTION

Patent No. 3,492,393  Dated January 27, 1970

Inventor(s) Richard D. Nourot, Paul R. Matvey & Keith D. Robins

It is certified that error appears in the above-identified patent and that said Letters Patent are hereby corrected as shown below:

Column 6, line 17, change "TDOI" to -- TODI --;

Column 7, line 8, change "TDOI" to -- TODI --.

Signed and sealed this 9th day of November 1971.

(SEAL)
Attest:

EDWARD M. FLETCHER, JR.　　ROBERT GOTTSCHALK
Attesting Officer　　　　　　Acting Commissioner of Patents